June 3, 1930.  W. W. ODELL  1,762,100
PROCESS FOR MAKING COMBUSTIBLE GAS
Filed March 4, 1927
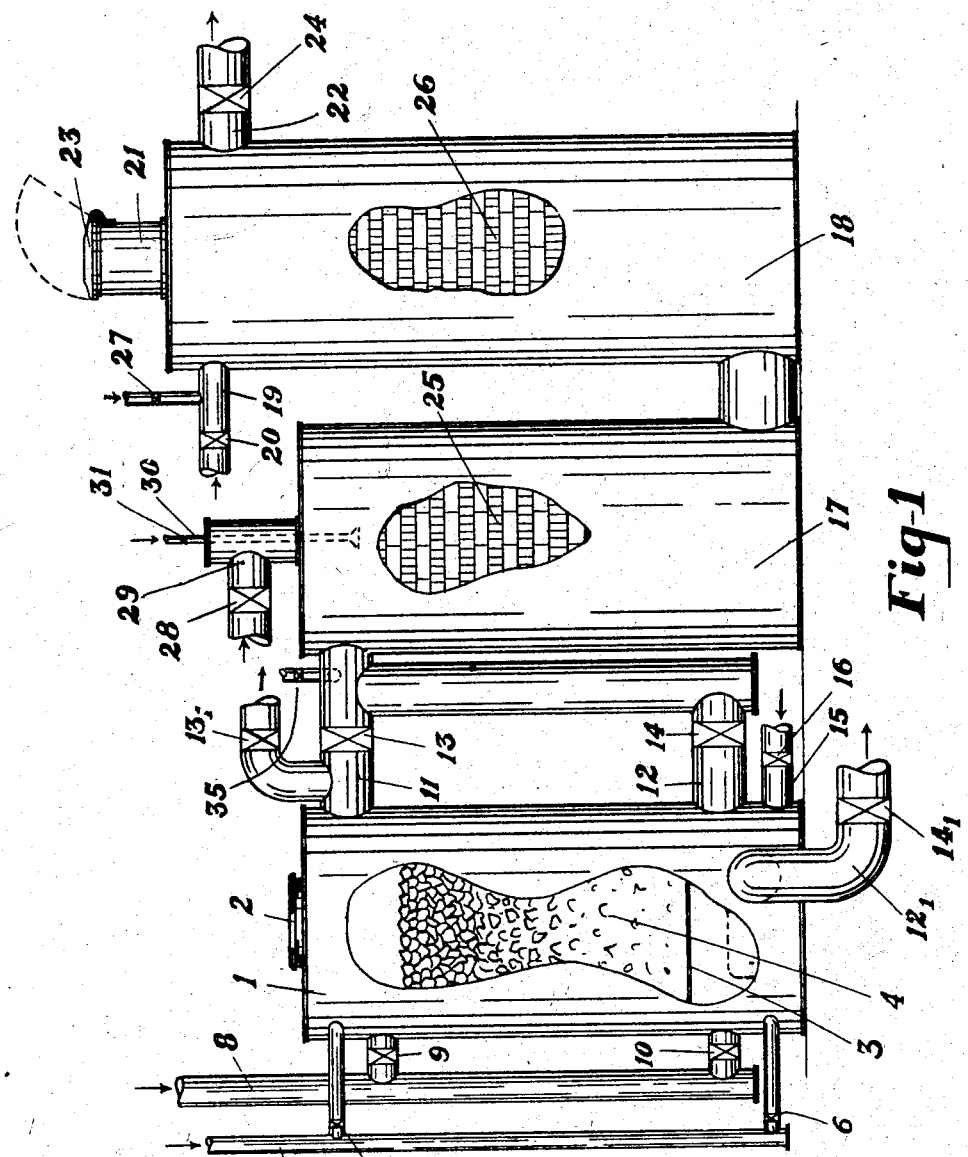

Patented June 3, 1930

1,762,100

UNITED STATES PATENT OFFICE

WILLIAM W. ODELL, OF MINNEAPOLIS, MINNESOTA, ASSIGNOR TO COLUMBIA ENGINEERING AND MANAGEMENT CORPORATION, OF CINCINNATI, OHIO, A CORPORATION OF OHIO

PROCESS FOR MAKING COMBUSTIBLE GAS

Application filed March 4, 1927. Serial No. 172,73 

In essence, the process consists in generating combustible gas containing hydrogen and carbon monoxide, using one or more hydrocarbons of the paraffin series as a fuel for the generation of at least a part of it; natural gas being a ready and low priced source of supply of said hydrocarbons. An important part of the process is based upon the chemical reactions occurring when the paraffin hydrocarbons are subjected to the action of heat, i. e., when they are caused to contact heated surfaces, particularly in the presence of steam; the contacting surface may be carbonaceous or other substance.

The objects of my invention are:

1. To utilize economically the paraffin hydrocarbons which, in the natural-gas fields are so frequently wasted.

2. To produce a gas, using said hydrocarbons, which will have the right proportional amounts of carbon monoxide (CO) and hydrogen ($H_2$) for the synthetic production of methanol, i. e., about two parts of $H_2$ to one part of CO, since the methanol reaction is represented by the equation (1) $CO + 2H_2 = CH_3OH$ 3. To provide a flexible means of producing gas of standard quality using paraffin hydrocarbons, in chemical reactions, in the generation of a part thereof.

4. To produce water gas with higher efficiency and at a lower cost than when using solid fuel alone, by the use of said hydrocarbons in chemical reactions.

5. To utilize and recover in the combustible gas made a large portion of the volatile combustible matter of a bituminiferous or other solid fuel when the latter is used as water-gas generator-fuel.

6. To increase the gas making capacity of the generator of a carburetted water-gas set, particularly when bituminous or high volatile solid fuels are used in the generator.

It should be noted that with the advent of the new and improved oil-cracking processes so much of the low-density hydrocarbons are formed that a limit has been put upon the amount of the latter which can be present in natural-gas gasoline used in blending; and this has resulted, in very recent months, in the availability of large quantities of $C_2H_6$, $C_3H_8$, and $C_4H_{10}$, which can be obtained either in a high degree of purity or mixed with each other or with methane. The propane ($C_3H_8$) and butane ($C_4H_{10}$) are now wasted to a large extent by being burned in "pilots" in some of the natural-gas fields even in those fields where the methane and ethane are piped to centres of consumption.

I find it possible to produce hydrogen and carbon monoxide, using the paraffin hydrocarbons, at a lower cost than when using solid fuel only at nominal prices, and without the formation of free carbon.

The chemical equations of interest and which are alluded to hereinafter are as follows:

(2) $CH_4$ upon heat cracking $= C + 2H_2$
(3) $C_2H_6$ upon heat cracking $= 2C + 3H_2$
(4) $C_3H_8$ upon heat cracking $= 3C + 4H_2$
(5) $C_4H_{10}$ upon heat cracking $= 4C + 5H_2$
(6) $CH_4 + H_2O = CO + 3H_2$
(7) $C_2H_6 + 2H_2O = 2CO + 5H_2$
(8) $C_3H_8 + 3H_2O = 3CO + 7H_2$
(9) $C_4H_{10} + 4H_2O = 4CO + 9H_2$
(10) $C + H_2O = CO + H_2$
(11) (6+10) $CH_4 + C + 2H_2O = 2CO + 4H_2$
(12) (7+10) $C_2H_6 + C + 3H_2O = 3CO + 6H_2$
(13) (8+10) $C_3H_8 + C + 4H_2O = 4CO + 8H_2$
(14) (9+10) $C_4H_{10} + C + 5H_2O = 5CO + 10H_2$ In the above there are three classes of reaction; equations 2 to 5 inclusive show the effect of completely cracking the paraffins by the application of heat; equations 6 to 9 inclusive show the effect of heating them in the presence of sufficient steam to combine with the carbon by the water-gas reaction as shown in equation 10. Equations 11 to 14 inclusive are respectively combinations of 6, 7, 8 and 9 with equation 10. It will be observed that in each of these "combination equations" the volume ratio of $H_2$ to CO in the products of reaction is 2 to 1, which is a desirable proportion for the production of synthetic methanol by equation 1. It is obvious then that in the generation of the ideal water-gas ($CO + H_2$ mixture) using paraffin hydrocarbons there is a preferred proportion of steam and carbon to be used with the latter, and this proportion is shown by the combination-equations 11 to 14. In common practice in generating water-gas a much larger amount of steam is necessarily used than enters into the chemical reaction and this will hold true in this instance. Therefore in controlling the reactions 11 to 14 it is necessary to use substantially that quantity of the hydrocarbons which will increase the volume ratio $H_2$ to CO above that of equation 10, in which the ratio is 1 to 1, and preferably a sufficient amount to make the ratio 2 to 1, when making a gas for use in synthesizing methanol. This ratio can be varied at will within certain limits; equation 6 shows the conditions for a ratio of 3 to 1 and the other equations show smaller ratios; that in equation 10 in which no hydrocarbons enter the reaction, being 1 to 1. The low limit is about 1 to 1, but there is practically no upper-limit ratio short of infinity when reactions 2 to 5 are considered. The latter reactions do not represent efficient gasification and are not of themselves new. The process of making water gas—(CO and $H_2$ mixtures) having a hydrogen-carbon monoxide ration of substantially 2 to 1 by the high temperature reactions represented by equations 11, 12, 13 and 14 or combinations of them, using a substantially definite proportion of hydrocarbons, steam and carbon in the reactions as shown, is believed to be a new combination in the art. It will be noted that propane ($C_3H_8$) and butane ($C_4H_{10}$) yield a gas, by reactions represented in equations 8 and 9, which is quite satisfactory for the production of methanol ($CH_3OH$). Thus it is apparent that the reaction shown in equation 10, commonly known as the water-gas reaction, need not enter into or become a part of the reaction producing a mixture of $H_2$ and CO—other than in the conversion of the carbon of hydrocarbons to CO. In other words, additional carbon is not necessary. Also it is to be noted that the gas generated is substantially free from suspended carbon thereby making it unnecessary to treat the gas for the removal of carbon.

The apparatus in which I am able to make gas by my process is shown in Fig. 1. Figure 1 is a front elevation of a suitable gas generator set, with portions of the shells cut away to show the interior in section for clearness. The generator is shown connected with double checker chambers such as the carburetor and superheater of a carburetted water-gas set, but obviously it can function without the latter.

In Figure 1, 1 is the generator shell having charging door 2 for charging solid fuel or other contact material shown at 4 and supported by grate bars 3. The steam supply line is shown at 5, having inlet control valves for up and down-run steam respectively at 6 and 7. Hydrocarbon gas is supplied to the generator through supply-line 8, having inlet control valves 9 and 10. The offtakes for finished gas are shown at 11, 12 and $12_1$, and the respective control valves are shown at 13, 14 and $14_1$. Air is supplied through inlet 15 and control valve 16. The checker chambers 17 and 18 are so connected that gas from 13 and 14 can be passed through them and out through offtakes 21 and 22 by controlling valves 23 and 24. A connection for hydrocarbon gas is shown at 19 with control valve 20. Checkerbrick or contact material is shown at 25 and 26 and a steam control valve at 27 for introducing steam into chamber 18. Secondary air is admitted through 28 and 29, and enriching oil or other carburetting material, is introduced through 30 and 31. A steam inlet for cooling back-flow gas and valves is shown at 35.

Before describing the operation by my process I call attention to the fact that in the manufacture of water gas or carburetted water-gas the gas making capacity of the generator is much lower using bituminous coal than with coke, and this difference is due to the difficulty in heating the mass of fuel in the generator to a gas-making temperature; there is a larger percentage of relatively cold fuel in the generator using coal and in attempting to heat it by prolonged air blasting a large percentage of the combustible volatile matter is lost in the blast gas. To correct this evil I operate by my process in the production of water-gas or carburetted water-gas, in cycles as follows: Referring to Figure 1, the ignited fuel 4 is air blasted to incandescence by opening valve 16 and admitting air through 15, the blast gases being burned in chambers 17 and 18 by the air introduced through 28 and 29 and then discharged through 11, 13, 17, 18, 21 and 23. The air blasting is discontinued, valve 16 is closed, cap 23 is closed and valves 6 and 24 are opened, valve 13 remaining open, and a regular steam run is made. Either alternate up and down steam-runs are made or split-runs are made during the steaming periods; one air-blasting and one steaming period making a complete cycle. The cycles are repeated. When down steam runs are made, valves 6, 13, and $13_1$ are closed and valves 7 and 14 are opened. During the admission of steam during the up-runs, hydrocarbon gas is also admitted to the fuel bed by opening valve 10. In this manner less solid fuel is consumed in the generator during the steam-run periods, less is used per thousand cubic feet of gas made, and therefore the rate of travel of the generator fuel downwards by reason of its consumption is decreased. Accordingly the fuel in the upper zone becomes hotter than it would without the addition of the hydrocarbon gas. This effect becomes more evident upon comparing equations 6 and 10. With the same quantity of steam, twice the volume of gas is made by equation 6 than by equation 10, and more heat is carried from the hot zone to the upper cooler zone of the generator by this increased volume of gas. The hydrocarbon gas may be introduced during each up-run, during a portion of each run, during both up and down runs, or during a certain, predetermined percentage of the total number of runs. Furthermore, an excess of hydrocarbon gas may be used, that is, beyond the normal end of the steam run period. In the latter period the gas is not appreciably cracked and functions chiefly as a heat-carrying agent, helping to equalize the temperature in the generator fuel-bed, and simultaneously carburetting the "make gas". When a mixture of paraffin hydrocarbons are introduced into the generator fuel bed, as through 10 during a prolonged part of an up-run, the higher members only of the series are appreciably cracked. In this manner the amount of cracking and the nature of the finished gas can be predetermined. Attention is called to the fact that the heat absorbed in the generator according to equation 6 is much less than is absorbed by equation 10, hence for a definite temperature condition in the generator fuel-bed the quantity of gas which can be made according to the former is more than double that which can be made according to equation 10. Similar comparisons can be made between equation 10 and equations 7, 8 and 9, the volume ratios being slightly different in each case, but the same general relation exists as a study of the equations will reveal. It appears that not only is the capacity of the generator increased when using coal as fuel and the gasification efficiency raised above that of normal practice, but the overall efficiency in making carburetted water-gas and employing hydro-carbon gas as described is higher than other processes using hydrocarbons, such as the combined oil-gas, reformed-gas process and the like, so far as I am aware.

So far, the use of hydrocarbon gas on the up-runs only, has been discussed. It can be used when desired on the down-runs as well, but when using coal as generator fuel it should not be admitted cold to the top of the generator fuel, although with coke fuel this can be satisfactorily done. Means are provided for introducing the hydrocarbon gas through valve 20 and inlet 19, and steam through 27, when using coal in the generator. In this manner the gas, and preferably, the steam also are preheated before reaching the fuel bed. In fact a considerable amount of reactions 6, 7, 8 and 9 takes place in the checker chambers 17 and 18 before reaching the generator fuel-bed. To a large extent the amount of carbon (generator fuel) consumed during the run when operating in the manner described above is controlled by varying the proportions of steam and hydrocarbon gas used. When using coke fuel and using a large proportion of hydrocarbon gas there is a tendency for the fuel in the upper part of the fuel bed to become too hot. Under these conditions the hydrocarbon gas is admitted to the generator from above the fuel bed, i. e., through valve 9, the steam being admitted through valve 7 and the "make gas" being removed through 14 or $14_1$ as desired.

In the generation of gas for use in manufacturing synthetic methanol, when the proportion of CO and $H_2$ must be held within fixed limits and when the latter gases are preferred to the exclusion of other gases it is necessary to operate with fuel-bed temperatures well above the dissociation or reaction temperatures; this is provided for by adjusting the amount of air used with respect to the steam and hydrocarbon gas used; short cycles are used under these conditions. After the generator is in operation it is only necessary to analyze the generated gas to determine whether or not the cycle should be changed and whether the air, steam and hydrocarbon gas are properly proportioned. For example, with insufficient air blasting, or its equivalent, too much steam and hydrocarbon gas, the percentage of $CO_2$ and $CH_4$ in the generated gas increases. With sufficient air blasting, the CO content of the generated gas increases as the ratio of steam to hydrocarbon gas increases. Should it be desirable to materially increase the content of $H_2$ beyond that shown in equations 6 to 14 it is only necessary to materially reduce the amount of steam used and allow reactions 2 to 5 to take place according to the hydrocarbon used.

The paraffins are not the only hydrocarbon gases which can be used in the production of mixed CO and $H_2$ by chemical reaction with steam; they are mentioned in particular because they are commercially available in large quantities. Ethylene $(C_2H_4)$ a by-product in the cracking of petroleum in the manufacture of gasoline is also a suitable hydrocarbon for the purpose as shown by the following equations:

(15) $C_2H_4$ upon heat cracking $= 2C + 2H_2$
(16) $C_2H_4 + 2H_2O = 2CO + 4H_2$
(17) $C_2H_4 + C + 3H_2O = 3CO + 5H_2$ The higher olefin gases react in a similar manner giving a gas at high temperatures comprising two molecules of hydrogen to one of carbon monoxide, for example

(18) $C_3H_6 + 3H_2O = 3CO + 6H_2$
(19) $C_4H_8 + 4H_2O = 4CO + 8H_2$

In other words, one way of converting $C_2H_4$ into methanol is shown by equations 16 and 1. It will be noted that in equation 16 the gas formed has the right proportion of CO and $H_2$ for equation 1, hence for the latter purpose, when using $C_2H_4$ in the generator it is desirable to consume as little generator fuel is desirable to consume as little generator fuel during the steam run as possible and to adjust the steam and $C_2H_4$ proportions so that the "make gas" is substantially as shown in equation 16. One of the fundamentals of my process, then, consists in: causing steam and hydrocarbon gas to be introduced simultaneously into an incandescent mass of solids, which mass may or may not comprise coal, coke or the like and causing said steam and gas to react chemically in definite proportions which are substantially and at least one molecule of $H_2O$ for every carbon atom present in the reacting hydrocarbon gas. The complete cycle of operation, using a multiple-shell set, as shown in Figure 1, and using hydrocarbon gas on both the up and down runs is substantially as follows: Up blast the ignited fuel in the generator with air until it is incandescent, meanwhile conducting the blast gas into the attached checker chambers, burning it therein by the addition of secondary air admitted through 29 and causing the burned gas to pass out of said chambers through 23; discontinuing the air-blasting and introducing both steam and hydrocarbon gas from beneath the fuel bed, removing the reaction products from above the fuel bed and causing them to pass through the checker chambers; discontinuing this steam run and repeating the cycle, except that the subsequent steam run is made as follows: steam and hydrocarbon gas are introduced into the top of the superheater in molecular proportions, caused to react at least in part in the checker chambers and conducted into the generator fuel-bed from above it, the finished gas being removed from beneath the fuel bed through $12_1$ and $14_1$. Obviously, instead of making alternate up and down runs, split runs can be made or a combination of split runs and up and down runs; this is a common practice in water-gas generation. Likewise, steam alone may be used during some of the runs, omitting the hydrocarbon gas in order to correct any deviation from the selected or desired percentages of carbon monoxide and hydrogen in the finished gas.

When it is intended to use the gas made as city gas, enricher may be added to the "make gas" flowing through the checker chambers or elsewhere. If oil is used as enricher it can be cracked more efficiently in the atmosphere of $CO+H_2$ than in the oil-gas process; the efficiency of gasification in the latter process being less than 50 per cent, whereas with the same gas oil the gasification efficiency in the cracking of said oil in an atmosphere of $CO+H_2$ is 70 per cent or more. When sufficient hydrocarbon gas is available, I prefer to enrich the $CO+H_2$ mixture by introducing the former into the latter in the checker chambers. A special inlet for it is not shown for simplicity, since about the same result is obtained by opening valve 9 on the up runs and valve 10 on the down runs. This method of introducing the enricher tends to keep valves 13 and 14 cool.

There are conditions and localities in this country where it is necessary to alter the gas making process used in generating city gas because of a variation in the supply of natural gas and variation in demand for gas. I believe I have a "flexible" unit which may be subjected to considerable variation in operation without materially altering the quality of the finished gas. For example, in the apparatus shown in Figure 1, water-gas can be made in the generator almost entirely from hydrocarbon gas, such as natural gas, and enriched with natural gas when the supply of the latter is sufficient to meet the demand. On the other hand, when this supply is low, water gas can be made in the generator essentially from solid fuel, using the natural gas for enriching only; in extreme cases the enriching can in part be done by introducing gas oil into the checker chambers, as in the standard carburetted water-gas process. It may be done by introducing hydrocarbon gas through 10 or 9 on up and down runs respectively during the latter part of the steam runs.

In making straight $CO+H_2$ mixtures, containing only small percentages of other gases, from hydrocarbon gas as a base raw material, or from both hydrocarbon gas and solid generator fuel, the temperature of the checker bricks in chambers 17 and 18 should be appreciably higher than is common practice in making carburetted water-gas. The temperature should be preferably, above 1700 degrees Fahrenheit; average temperatures of 1750 to 1900 degrees Fahrenheit are satisfactory. When gas oil is used and a carburetted gas, such as city gas, is made lower temperatures are more satisfactory, namely, 1400 to 1550 degrees Fahrenheit. The latter is also true when carburetting by introducing hydrocarbon gas into the gas entering checker chambers 17 and 18 from the generator.

Coal, coke, or the like, is a satisfactory filler for the generator, and is a splendid contact medium for carrying on reactions as represented by equations 2 to 17 inclusive.

When it is desirable not to completely crack all of the hydrocarbon gas used in the process, and yet to maintain high temperatures in the chambers 17 and 18, the operation is so conducted that the gas produced in the generator does not pass through chambers 17 and 18. In this manner the checker-bricks in the latter chambers can be used to full advantage for producing carbon monoxide and hydrogen from steam and hydrocarbon gas by admitting the latter materials respectively through 27 and 20. The complete operation is as follows: First, air-blast fuel 4 with air through 15, conducting blast gas into checker chambers 17 and 18, through 13, simultaneously admitting secondary air to 17 through 28 for combustion of the blast gas, discharging the products of combustion through 21 and 23. Now discontinue the air blasting, close stack 23 and introduce steam through 6 and hydrocarbon gas through 10, taking the resulting product off through $13_1$, admitting hydrocarbon gas to generator through 9 also when enriched gas is desired. A subsequent cycle is made by first air-blasting as just described and then, when the generator fuel 4 and the checkerbricks 25 and 26 are sufficiently hot, discontinuing the air-blasting, closing stack 23, introducing steam and hydrocarbon gas simultaneously through 27 and 20 respectively, causing them to react chemically during their passage through 18 and 17, conducting the reaction products and any excess of either gas or steam or both out of 17 through the generator fuel-bed 4 and out of generator; the latter step may consist in passing the gaseous products from 17 through 13 and 11, down through fuel bed 4 and out through $12_1$ and $14_1$, or, when 13 is closed, through 14, up through fuel bed 4 and out through $13_1$. When said gaseous products from 17 are passing through solid fuel bed, either upwardly or downwardly, additional steam is introduced into fuel bed 4 simultaneously with them by opening respectively valves 6 and 7. When sufficient hydrocarbon gas is available it is also introduced into the fuel bed 4 along with the steam and the gaseous products from 17 by opening valve 10 before up runs and valve 9 before down runs. Furthermore, when the enriching is done with hydrocarbon gas, both valves 9 and 10 are open during up and down runs, the extent of enriching in this instance depending upon the relative amounts of hydrocarbon gas used in the reactions and introduced after the products have emerged from the fuel bed.

My gas generating apparatus is so designed that a substantially constant quality of gas can be made therein, using varying relative amounts of steam and hydrocarbon gas in the process. The temperatures in the checker chambers 17 and 18 are maintained by the combustion of blast gas therein, but when necessary or desired additional gas is supplied thereto by opening valve 9 during the upward air blasting of the generator fuel 4. Finished gas can be taken from generator through offtakes and valves at top and bottom (above and below the fuel bed) as shown at $13_1$ and $14_1$ besides the offtakes leading through the checker chambers.

It is common knowledge that both hydrogen and carbon monoxide when separately mixed with air are inflammable over a wide range of mixtures and that the maximum rate of flame propagation through the hydrogen-air mixture is much greater than that of mixed air and carbon monoxide. For this reason and because of the wide difference in density between hydrogen and carbon monoxide, it is preferable that the gas made for use alone or enriched as city gas have a specific gravity within definite limits and burning properties that are not appreciably different from those of other gases for which it may be interchangeably substituted. Accordingly the gas made by reaction of the hydrocarbon gases with steam should not only be free from suspended carbon but the hydrogen to carbon monoxide ratio should be confined within certain limits as shown, namely, from three to one, respectively, to two to one respectively. This I accomplish in my process by controlling the amount of steam and hydrocarbon gas used, the duration of the cycle which is shown to be short, and the temperature of the contact surface for reaction. The equations show substantially the results I obtain.

I prefer not to limit myself to the use of particular hydrocarbons, since practically all hydrocarbons react similarly in an incandescent fuel bed in the presence of steam. An atomized liquid hydrocarbon is considered to be a gaseous hydrocarbon.

Attention is called to the fact that it is not possible to air-blast a fuel bed to a uniform temperature throughout and that in my process a step toward this goal is made; the temperature gradient throughout the fuel bed, operating with the introduction of hydrocarbons with the steam, is smaller than in normal water-gas generation. Because of the latter I am enabled to quite completely decompose unsaturated hydrocarbons and to generate from steam and hydrocarbons, mixed hydrogen and carbon monoxide of a high degree of purity.

I do not claim as my own the step comprising the carburetion of water-gas by the addition thereto of cold hydrocarbon gas without cracking.

I claim:

1. A process of generating gas which gas is substantially free from suspended carbon resulting from hydrocarbon decomposition which consists in, introducing hydrocarbon gas into a mass of solid fuel heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one.

2. A process of generating gas which gas is substantially free from suspended carbon resulting from hydrocarbon decomposition which consists in, introducing hydrocarbon gas into a mass of solid fuel heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially two to one.

3. A process of generating gas which gas is substantially free from suspended carbon resulting from hydrocarbon decomposition which consists in, introducing hydrocarbon gas of the paraffin series into a mass of solid fuel heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one.

4. A process of generating gas which gas is substantially free from suspended carbon resulting from hydrocarbon decomposition which consists in, introducing hydrocarbon gas of the paraffin series into a mass of solid fuel heated to a degree sufficient to decompose the hydrocarbon gas, simultaneously introducing steam therewith in amount sufficient to effect substantially complete reaction with the hydrocarbon gas, thereby producing gas comprising essentially hydrogen and carbon monoxide and in which the ratio of hydrogen to carbon monoxide is substantially two to one.

5. A process of generating gas which gas is substantially free from suspended carbon resulting from hydrocarbon decomposition which consists in, introducing hydrocarbon gas into a mass of solid fuel heated to a degree sufficient to decompose the hydrocarbon gas and to a temperature sufficient for a water gas reaction to occur, simultaneously introducing steam therewith in amount sufficient to effect substantially complete reaction with said hydrocarbon gas and simultaneous reaction with carbon in the said mass of fuel to the extent that the resulting gas comprises hydrogen and carbon monoxide in the ratio of substantially two to one.

6. A process of generating gas which gas is substantially free from suspended carbon resulting from hydrocarbon decomposition which consists in, introducing hydrocarbon gas of the paraffin series into a mass of solid fuel heated to a degree sufficient to decompose the hydrocarbon gas and to a temperature sufficient for a water gas reaction to occur, simultaneously introducing steam therewith in amount sufficient to effect substantially complete reaction with said hydrocarbon gas and simultaneous reaction with carbon in the said mass of fuel to the extent that the resulting gas comprises hydrogen and carbon monoxide in the ratio of substantially two to one.

7. A process of generating gas which gas is substantially free from suspended carbon resulting from hydrocarbon decomposition which consists in, introducing hydrocarbon gas into a mass of solid fuel heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially from two to one to three to one, introducing into a stream of the hot gas thus generated gaseous hydrocarbons in amount sufficient to produce an enriched gas being substantially city gas.

8. A process of generating gas which is substantially free from suspended carbon resulting from hydrocarbon decomposition which consists in, introducing hydrocarbon gas into a mass of solid fuel heated to a degree sufficient to decompose the hydrocarbon gas, simultaneously introducing steam therewith in amount sufficient to effect substantially complete reaction with the hydrocarbon gas, thereby producing a gas comprising essentially hydrogen and carbon monoxide and in which the ratio of hydrogen to carbon monoxide is substantially two to one, introducing into a stream of the hot gas thus generated gaseous hydrocarbons in amount sufficient to produce an enriched gas being substantially city gas.

WM. W. ODELL.